Nov. 12, 1940.  W. A. BRECHT  2,221,571
COMMUTATOR AND CLAMPING STRUCTURE THEREFOR
Filed April 14, 1938  2 Sheets-Sheet 1

WITNESSES:
Leon M. Garman
B. L. Zangwill

INVENTOR
Winston A. Brecht.
BY
O. D. Buchanan
ATTORNEY

Nov. 12, 1940.    W. A. BRECHT    2,221,571
COMMUTATOR AND CLAMPING STRUCTURE THEREFOR
Filed April 14, 1938    2 Sheets-Sheet 2
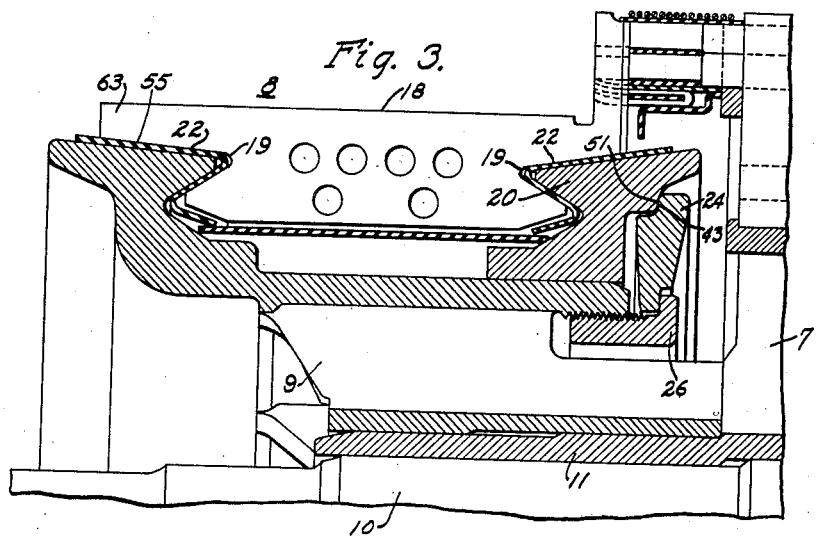
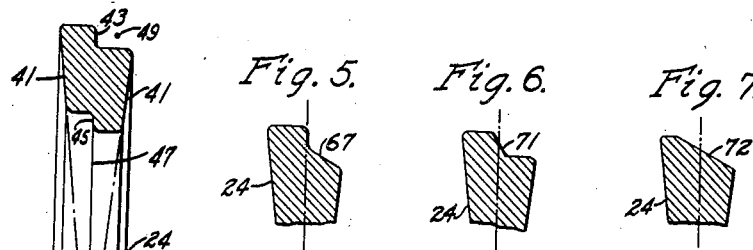
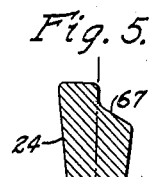 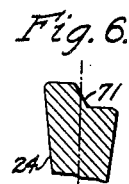 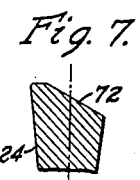
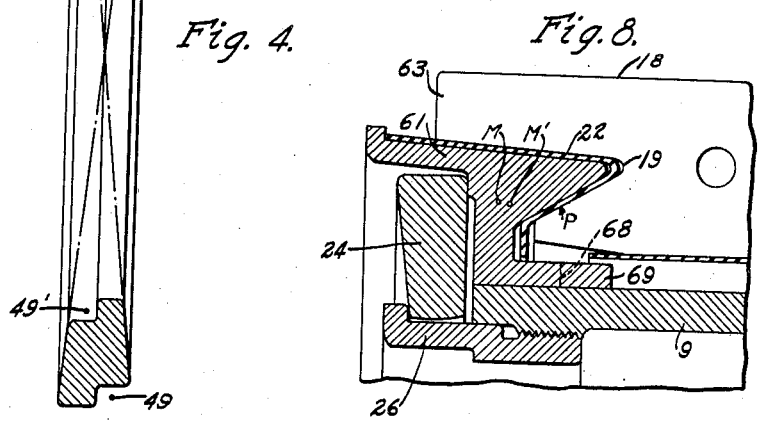
WITNESSES:
Leon M. Garman
B. L. Zangwill
INVENTOR
Winston A. Brecht.
BY O. B. Buchanan
ATTORNEY Patented Nov. 12, 1940

2,221,571

UNITED STATES PATENT OFFICE 2,221,571

COMMUTATOR AND CLAMPING STRUCTURE THEREFOR

Winston A. Brecht, Forest Hills, Pa., assignor to Westinghouse Electric & Manufacturing Company, East Pittsburgh, Pa., a corporation of Pennsylvania Application April 14, 1938, Serial No. 201,948

12 Claims. (Cl. 171—321)

The disc spring commutator shown in Patent No. 1,826,628 granted October 6, 1931, to George A. Moore and assigned to the Westinghouse Electric & Manufacturing Company, has been found to be especially satisfactory and efficient in use, particularly so on motors requiring a high rating for a minimum of cubic content. The commutator described in this patent has enabled the use of high peripheral speeds without distortion of the commutator, and its construction has effectively eliminated the deleterious effects of aging in the commutator.

The commutator generally comprises commutator bars having V-grooves at the ends thereof clamped between two V-members by a disc spring retained in clamping position by a retaining nut. My invention adds refinements and improvements to a commutator of the type described in the aforesaid patent, but I desire it to be understood that my invention has application with many advantages to other structures.

Among the advantages of a commutator embracing my improvements to be subsequently described in detail are:

1. Greater strength for resisting the disruptive action of the centrifugal force of the commutator bars whereby higher peripheral speeds may be safely attained.

2. Parts so proportioned that a greater copper surface is available with no increase in the size of the commutator, or conversely, a smaller commutator can be used for a given rating.

3. Greater strength in the individual parts for resisting the forces between them.

4. A minimum of frictional hysteresis in the disc spring and between the disc spring and the V-member upon which it bears.

As a corollary to my improved commutator I have designed a new disc spring which has its pressure faces in the normal central transverse plane thereof and this spring may be deemed to be an improvement upon the spring shown and claimed in my Patent No. 1,826,597, granted October 6, 1931, to myself, and assigned to the Westinghouse Electric & Manufacturing Company.

Many other objects and advantages of my invention will become apparent upon studying the following description in conjunction with the drawings, in which:

Fig. 3 is a view, also similar to Fig. 1, of an additional modification with the disc spring of the commutator inward of the motor;

Fig. 4 is a view of my new spring in section;

Figs. 5, 6 and 7 are views of modifications of my spring in part-sections; and,

Fig. 8 is a part of Fig. 5 of the aforesaid patent to Moore for the purpose of disclosing some of the advantages of my commutator thereover.

Figure 1:
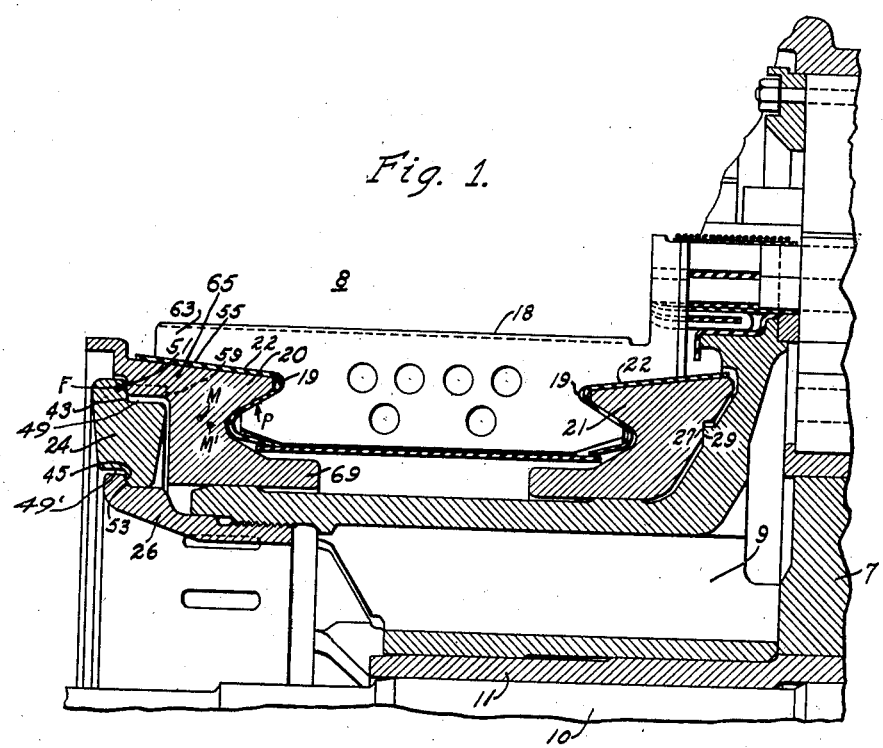
Figure 1 is a view partly in section and partly in side elevation of my new commutator.

Referring to Fig. 1, my improved commutator is shown applied to the rotor of a single phase railway motor usually having an armature member 7, the latter being connected with the commutator cylinder, indicated in its entirety by the reference numeral 8, which, in turn, is mounted on a commutator spider or bushing 9, carried by the armature shaft 10, either directly or through the medium of a sleeve 11, as shown.

The commutator cylinder 8 comprises a large number of wedge-section copper bars 18, insulated from each other by mica strips of the same shape and which are provided with V-grooves 19 at their ends, the strips and bars being held in place by means of two V-rings or members 20 and 21, which are covered by mica V-rings 22.

Figure 2:
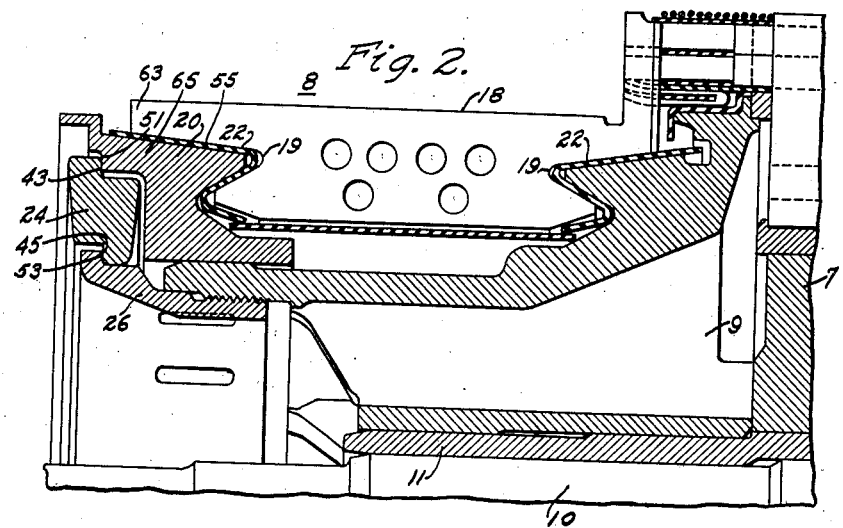
Fig. 2 is a similar view of a modification thereof wherein the right V-member and spider are made unitary.

The V-members 20 and 21 are, in this embodiment, shown as separate units resting upon the spider 9. It may be observed that these V-members are substantially symmetrical and by making them independent of the spider, I achieve a better balance of the internal forces between the commutator bars and these members. In the embodiment shown in Fig. 1, the spider 9 and the V-member 21 have cooperating pressure surfaces 27 and 29, respectively, through which the clamping pressure is transmitted. However, I do not desire to be limited to a commutator cylinder employing V-members independent of the spider and in Figs. 2 and 3 I show modifications wherein one or the other of said V-members is integral with the spider. Fig. 2 shows the right V-member and spider unitary with the disc spring pressing upon the left V-member, whereas Fig. 3 shows the left V-member unitary with the spider and also shows the disc spring pressing upon the right V-member. Obviously other permutations are possible.

The V-members clamp the commutator bars between them and this clamping pressure, which is applied during the assembly of the commutator cylinder, is maintained by means of the disc spring 24 and retaining ring nut 26, as fully described in the aforesaid Moore patent. However, I design the disc spring 24 with a somewhat different contour than that shown in the aforesaid Moore patent for obtaining certain advantages to be hereinafter described.

Referring to Fig. 4, I show the spring per se in section. The sides 41 of the spring are tapered after the fashion shown and described in my earlier patent aforementioned. However, the outer pressure face 43 and the inner pressure face 45 are formed substantially along the normal central transverse plane of the spring washer. It may be assumed that the material along the central transverse plane 47 is not stressed, inasmuch as the diameter of the disc in this plane does not change appreciably when the disc is deflected. Accordingly, the faces 43 and 45 are not strained to any appreciable extent during deflection of the spring.

For convenience in describing the form of this new spring, I designate the voids formed by making the bearing faces on the central transverse plane as "cut away" portions, these portions being indicated at 49 and 49'. However, I desire it to be understood clearly that this nomenclature is merely for the sake of convenience and does not necessarily refer to any machining operation.

The V-member 20, Fig. 1, has a pressure face 51 cooperating with the pressure face 43. The retaining nut 26 has a pressure face 53 cooperating with the pressure face 45. It may be observed that because of the disposition of the pressure faces of the disc spring, the V-member 20 may be formed to occupy the upper cut-away portion 49 and the retaining ring 26 may have its head occupying the cut-away portion 49'. The addition of material to the V-member at the cut-away portion 49 enables me to slant the V-surface 55 of the commutator bars 18 at an angle to the horizontal greater than that which is usually used, if I so desire. The reason for this is that if no cut-away portion were present in the spring as shown in Fig. 8, and the dotted lines 59 of Fig. 1, the V would have only little material between the commutator bars and the disc washer as shown at 61. To enable the V to have the necessary strength, it was previously necessary to obtain this at the expense of the aforesaid angle. This structure weakened the commutator bar extended portions 63. In my new construction, with added material in the V, I not only strengthen the V extension generally indicated by 65, but I am also able to strengthen the commutator bar extension 63.

It is quite obvious that the additional space formed by the cut-away portions 49 and 49' may be apportioned as desired between the commutator bar and the V-member 20. As a matter of fact, the space in the cut-away portions may be apportioned in both V-members 20 and 21 and the commutator bars. Which one of the three elements will be favored depends largely upon the design of the commutator for a particular purpose. Any one, or a combination of any one with any other, or all three elements may be altered to take advantage of the cut-away portions.

I prefer to extend the commutator bars 18 as much as possible, confining the material in the V-members to an amount sufficient to withstand the forces acting upon them. By so enlarging the commutator bars 18 I obtain a greater brush bearing surface therefor as well as a greater cooling area. In view of the fact that these two factors largely determine the rating of the commutator, I have by this construction increased the rating of the commutator cylinder without any appreciable increase in the overall length thereof.

I may provide additional cut-away portions by tapering the face 67 of the disk spring as shown in Fig. 5, and by forming the V-member to correspond I thereby provide further leeway for the proportioning of the V-members and commutator bars.

Some of the factors which determine the permissible peripheral speed of a commutator cylinder of the type described are the forces tending to resist the disruptive turning action due to centrifugal force of the commutator bars 18 on the V-members, and the disruptive forces created by the different expansion and contraction of the copper and steel due to temperature changes. The seasoning of the commutator assembly is also a disruptive factor as fully explained in the aforesaid Moore patent.

The detrimental forces may be deemed as acting on the adjacent pressing surfaces between the V-member and the commutator bars; and a component of the resultant of which is indicated by P. If, now, it be assumed that the center of gravity of the V-member be at the point M, the couple tending to disrupt the cylinder would be force P times the perpendicular distance from M thereto. If this product can be minimized or the couples counteracting it made greater, then the cylinder can be given a greater peripheral speed. By providing an extension 69 (the dotted line 68 in Fig. 8 showing the prior structure) on the V-member 20 extending along the spider 9, the center of gravity M is moved downward and to the right as indicated at M'. Manifestly the moment due to the force P is decreased inasmuch as the effective distance thereto from the center of gravity has been lessened. However, it may be noted that the additional material provided in the V-member that occupies the cut-away portion 49 will tend to neutralize the effect of extension 69. I can, however, by making the extension smaller or greater, partially balance, entirely balance, or more than balance this neutralizing effect. Moreover, the added mass of the V-member in the cut-away portion, or the extension, or both increases the moment of inertia of the V-member thereby resulting in an added factor opposing the deflecting action of the commutator disruptive forces, and also reducing the stress in the V-member. It may thus be observed that by controlling the form of the cut-away portions and the mass of extension 69 I control the location of the center of gravity M' of the V-member, and its moment of inertia, and can minimize the disrupting moment due to the disruptive forces generally indicated by the component P.

By controlling the shape of the cut-away portion, I provide a further means by which the moment opposing the moment due to the aforesaid force P can be controlled. The force upon the V-member 20 due to the deflection of the disc spring 24 is represented by F. By positioning the pressure face 43 with respect to the center of gravity I can control the moment due to this force F. However, inasmuch as I prefer to have the bearing face 43 in proximity to the normal central transverse plane of the spring, I achieve a similar result by tapering the bearing face 43 as shown at 71, Fig. 6. By such taper I direct the force F at an upward angle and thereby increase the distance of the perpendicular from the center of gravity to the line in which the force F acts. It is manifest therefore that for a given force F the tapering of the pressure face 43 will increase the moment of this force as a trigonometric function of the angle of the taper.

In Fig. 7, I show a further modification of the cut-away portion of the spring in which the bearing surface 72 is formed entirely of a straight edge tapered with respect to the sides of the spring. It is quite obvious that any angle may be used to form the contour of the cut-away portion of the spring, and I do not desire to limit myself in this respect.

I prefer to have pressure faces of the disc spring in the normal central transverse plane or in proximity to the central normal transverse plane, for by such structure the pressure surfaces are subjected to a minimum of frictional stress. Variation of the axial deflection of spring 24, due to changes in the force P whatever the cause, be it speed, seasoning, temperature change or the like, will produce substantially no radial sliding between the opposing pressure faces. In a structure wherein the opposed pressure faces are not in the normal central transverse plane of the spring, hysteresis is present, that is, the curve of the deflection of the spring with force increasing is not the same as the deflection curve with force decreasing. This hysteresis is greater as the pressure faces are displaced from the central plane of the spring.

By the application of the principles of my invention, a commutator is obtained which will be smooth and round under higher standards of speed and temperature than has heretofore been possible. A commutator embodying the principles of my invention can therefore be given higher ratings than others of the same size and design but not employing such principles.

In the foregoing specification, and in the claims, I have used the expression the grooves, V-members, V-rings and the like in accordance with the usual terminology of the art without any intention of limiting myself to any precise form whether it be an exact V or not. In general, I desire my specification to be construed as merely illustrating a preferred application or applications of my invention to a commutator design, rather than as limiting my invention to the precise details shown, and I desire that the language of the appended claims be construed in the broadest manner consistent with this specification and my improvements over the prior art.

I claim as my invention:

1. A commutator cylinder comprising a plurality of commutator bars having V-grooves in their ends, two annular V-members for retaining the ends of said bars, and means for drawing together said V-members comprising a disk-spring applying a substantially uniform pressure around its outer pressure face, said pressure face being in proximity to the normal central transverse plane of the said disk spring.

2. A commutator cylinder comprising a plurality of commutator bars having V-grooves in their ends, two annular V-members for retaining the ends of said bars, and means for drawing together said V-members comprising a disk-spring applying a substantially uniform pressure around its outer pressure face, said pressure face being inward with respect to the sides of said spring thereby to provide space which may be apportioned between said bars, said V-members, and said drawing together means whereby said cylinder may have a greater rating for a given space or a smaller size for a given rating.

3. A commutator cylinder comprising a plurality of copper commutator bars having V-grooves in their end, means including two annular V-members for retaining the ends of said bars and means for drawing together said two V-members comprising a spring washer having an outer pressure face substantially in the normal central transverse plane of said spring washer and an inner pressure face, said washer being disposed with its outer pressure face pressing against one of said V-members, and means for applying a substantially continuous uniform force on the inner pressure face of said washer.

4. In a dynamo-electric machine, a commutator cylinder comprising a plurality of wedge shaped copper commutator bars having V-grooves in their ends, and insulation in said grooves, two annular V-members for retaining the ends of said bars and means for drawing together said two V-members, characterized by the fact that said drawing together means comprises a disk spring for permitting thermal expansions and contractions without loosening of the copper bars, said disk spring characterized by having an outer shoulder providing a pressure face bearing against one of said V-members, and an inner shoulder providing a second pressure face, said drawing together means including a securing means bearing against the last said pressure face to flex said disk spring.

5. A commutator cylinder comprising a plurality of commutator bars having V-grooves at one end, a spider having pressure applying means at one end, an annular V-member cooperating with said grooves, and means for drawing together said spider and said V-member, said last means comprising a disk spring applying a substantially uniform pressure around its pressure face to said V-member, said face being in proximity to the normal central transverse plane of said disk spring.

6. A commutator cylinder comprising a plurality of commutator bars having V-grooves at one end, a spider having pressure applying means at one end, an annular V-member cooperating with said grooves, and means for drawing together said spider and said V-member, said last means comprising an annular disk spring having two portions of substantially the same width but with one having greater radii than the corresponding radii of the other whereby pressure faces are formed substantially at the normal transverse plane of the spring, the inner of said faces facing away from and the outer towards said cylinder, said outer face acting on said V-member, said last means also comprising a nut holding said spring deformed and bearing against the said inner face.

7. A commutator cylinder comprising, a plurality of commutator bars having V-grooves in their ends, annular V-members for retaining the ends of said bars, a spider upon which said V-members slidably rest, said spider having means contacting one of said V-members for applying pressure thereto, and means for drawing together said spider and the other V-member whereby said commutator bars are clamped between said V-members, said last means comprising a disk spring and a retaining nut, said disk spring having a face bearing against said nut and another face bearing against said other V-member, and in which one of said faces is substantially in the normal central transverse plane of the spring.

8. The combination in a commutator cylinder of the type having a plurality of commutator bars with V-grooves at the ends thereof, two V-members for retaining the ends of said bars, and means for drawing together said V-members comprising a disk spring and retaining nut; in which combination the said spring is formed to provide an outer cut-out portion towards the cylinder and an inner cut-out portion away from the cylinder whereby the nut retaining head abuts a face in said inner cut-out portion and a said V-member abuts a face in said outer cut-out portion.

9. The combination in a commutator cylinder of the type including a plurality of commutator bars with V-grooves in at least one end thereof, a V-member for retaining said ends and means for applying bar clamping pressure to said V-member comprising a disk spring pressing against said V-member; in which combination said disk spring is formed with a cut-away portion having a pressure face tapering toward the center of said V-member, said V-member having a face bearing against said pressure face.

10. The combination for a commutator cylinder of the type including a plurality of commutator bars with V-grooves at one end thereof, a V-member for retaining said ends, and means for applying bar clamping pressure to said V-member comprising a disk spring pressing against said V-member; in which combination said V-member is formed with a bottom extension and an opposite enlarged mass to minimize the turning moment on the V-member due to disruptive action of the bars.

11. A commutator cylinder comprising a plurality of commutator bars, means for clamping said bars together comprising a disk-spring provided with shoulders along its inner and outer peripheries having bearing faces substantially at the central transverse plane of said spring, with the outer of said bearing faces applying pressure to said bars, said means further comprising spring-flexing mechanism bearing against the other of said faces.

12. A commutator cylinder comprising a plurality of commutator bars having V-grooves at one end, a spider having pressure applying means at one end, an annular V-member cooperating with said grooves, means for clamping said bars between said spider and V-member, said V-member being slidable on said spider, said means comprising a disk spring, said spring having a shoulder with a pressure face for applying said clamping pressure, said V-member being formed with a portion on one side which is within said shoulder, said V-member being formed with an additional portion on the side opposite the last said side and adjacent said spider, for counterbalancing the first said portion, whereby the turning moment of the disruptive forces of the said bars on said V-member is reduced.

WINSTON A. BRECHT.